(12) United States Patent
Jang et al.

(10) Patent No.: US 9,886,452 B2
(45) Date of Patent: Feb. 6, 2018

(54) METHOD FOR PROVIDING RELATED INFORMATION REGARDING RETRIEVAL PLACE AND ELECTRONIC DEVICE THEREOF

(71) Applicant: Samsung Electronics Co., Ltd., Suwon-si, Gyeonggi-do (KR)

(72) Inventors: Keum-Ju Jang, Seoul (KR); Young-Keun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 14/322,470

(22) Filed: Jul. 2, 2014

(65) Prior Publication Data
US 2015/0088833 A1    Mar. 26, 2015

(30) Foreign Application Priority Data
Sep. 26, 2013   (KR) .......................... 10-2013-0114629

(51) Int. Cl.
*G06F 17/30* (2006.01)

(52) U.S. Cl.
CPC .. *G06F 17/30241* (2013.01); *G06F 17/30371* (2013.01)

(58) Field of Classification Search
CPC ......... G06F 17/30247; G06F 17/30725; G06F 17/30876; G06F 17/30241; G06F 17/30817
USPC ....................................................... 707/687
See application file for complete search history.

(56) References Cited

U.S. PATENT DOCUMENTS

| | | | | |
|---|---|---|---|---|
| 7,788,600 B2* | 8/2010 | Lau | ...................... | G06F 3/0481 701/532 |
| 8,060,582 B2* | 11/2011 | Bliss | ................... | G06F 17/3087 348/113 |
| 8,180,370 B2* | 5/2012 | Kim | ..................... | G06F 3/03543 455/187.1 |
| 8,965,696 B2* | 2/2015 | van Os | ............. | G01C 21/3626 701/400 |
| 9,008,693 B2* | 4/2015 | Boldyrev | .............. | H04W 4/043 455/456.3 |
| 9,069,865 B2* | 6/2015 | Bliss | ................... | G06F 17/3087 |
| 2010/0303286 A1* | 12/2010 | Kim | ......................... | G01S 5/16 382/100 |
| 2014/0226564 A1* | 8/2014 | To | ........................ | H04L 5/0044 370/328 |

FOREIGN PATENT DOCUMENTS

| | | |
|---|---|---|
| JP | 11-265141 A | 9/1999 |
| KR | 10-2006-0056580 A | 5/2006 |
| KR | 10-2007-0073087 A | 7/2007 |

* cited by examiner

*Primary Examiner* — Debbie Le
(74) *Attorney, Agent, or Firm* — Jefferson IP Law, LLP

(57) ABSTRACT

An electronic device and a method for providing related information regarding a retrieval place are provided. The method includes determining a retrieval place using at least one contents information, extracting information related to the determined retrieval place, and providing the information related to the determined retrieval place by determining a validity of the extracted information related to the determined retrieval place.

21 Claims, 9 Drawing Sheets

METHOD FOR PROVIDING RELATED INFORMATION REGARDING RETRIEVAL PLACE AND ELECTRONIC DEVICE THEREOF

CROSS-REFERENCE TO RELATED APPLICATION(S)

This application claims the benefit under 35 U.S.C. §119(a) of a Korean patent application filed on Sep. 26, 2013 in the Korean Intellectual Property Office and assigned Serial number 10-2013-0114629, the entire disclosure of which is hereby incorporated by reference.

TECHNICAL FIELD

The present disclosure relates to the method for providing related information regarding a retrieval place and an electronic device thereof.

BACKGROUND

As the functionality of an electronic device develops, a user may easily find a place to retrieve information using the electronic device. For example, the electronic device may access a database providing position information in order to receive accurate position information.

However, an electronic device of the related art should input advance information regarding a retrieval place which a user desires to find out in order to receive accurate position information. For example, it frequently occurs that the electronic device accesses a specific blog but the relevant blog provides only general information and does not provide accurate position information. Also, even in the case where the relevant blog provides position information, the position information may not be up-to-date position information, causing confusion to the user.

Therefore, an apparatus and a method for providing up-to-data accurate position information regarding a retrieval place which the electronic device desires to retrieve are required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method capable of improving a user's convenience by analyzing contents and providing information regarding a retrieval place which a user desires to find out.

Another aspect of the present disclosure is to provide an apparatus and a method capable of guaranteeing reliability of provided information by providing changed information in the case where information related to contents changes.

Another aspect of the present disclosure is to provide an apparatus and a method capable of meeting a user's desire who intends to pursue diversity by providing various information regarding a retrieval place such as telephone connection, web address connection, position information providing, and navigation connection.

Another aspect of the present disclosure is to provide an apparatus and a method capable of reducing a user's retrieving time and thus improving economics by providing accurate position information in cooperation with an existing database including position information even when only a schematic image exists.

In accordance with an aspect of the present disclosure, a method for operating an electronic device is provided. The method includes determining a retrieval place using at least one contents information, extracting information related to the determined retrieval place, and providing the information related to the determined retrieval place by determining validity of the extracted information related to the determine retrieval place.

In accordance with another aspect of the present disclosure, an electronic device is provided. The electronic device includes a processor module configured to determining a retrieval place using at least one contents information, to extract information related to the determined retrieval place, and to provide the information related to the determined retrieval place by determining validity of the extracted information to the determined retrieval place, and a memory configured to store data controlled by the processor module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1A, 1B, 1C, and 1D are views illustrating an embodiment of determining a retrieval place in an electronic device according to an embodiment of the present disclosure.

First, the electronic device may determine a retrieval place using at least one contents information. More specifically, the electronic device may determine a retrieval place in order to provide position information on the screen of the electronic device using a plurality of contents. That is, the electronic device may analyze at least one of an input keyword, voice information, QR code information, barcode information, image information, audio information, text information, and moving picture information to determine a retrieval place.

Figure 1A:
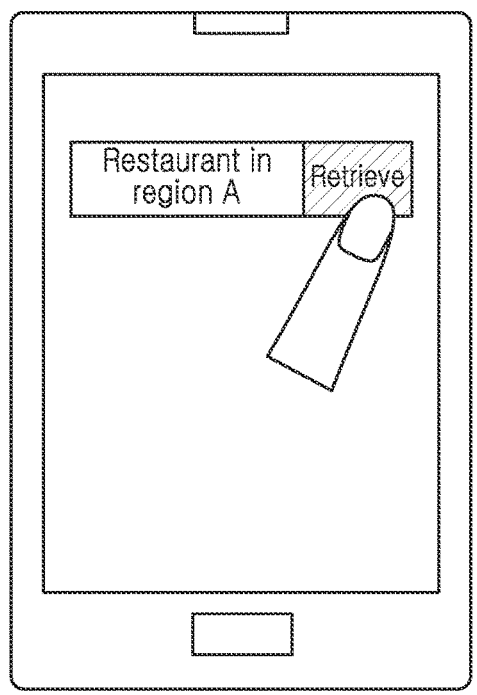
FIGS. 1A, 1B, 1C, and 1D are views illustrating an embodiment of determining a retrieval place in an electronic device according to an embodiment of the present disclosure.

Referring to FIG. 1A, assuming that a region A is a specific region inside the Republic of Korea, the electronic device may determine a retrieval place using a keyword of "regional restaurant" input on a search window of a web browser. That is, the electronic device may specify the Republic of Korea among nations throughout the world, and specify a region A among regions of the whole country inside the Republic of Korea. Therefore, the electronic device may determine a restaurant in the region A inside the Republic of Korea as a retrieval place.

Figure 1B:
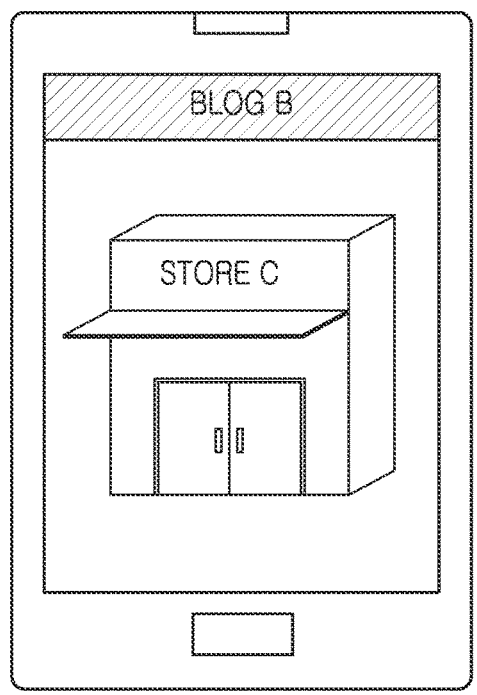

Referring to FIG. 1B, an electronic device accesses a web browser and then selects a "blog B". The electronic device may display an image of a "store C" posted on the "blog B". After that, the electronic device may analyze image information posted on the "blog B" to determine a "store C" is a retrieval place.

Figure 1C:
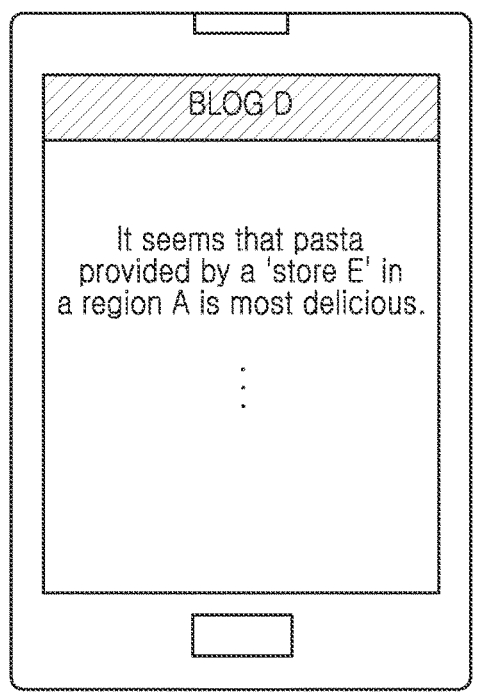

Referring to FIG. 1C, an electronic device accesses a web browser and then selects a "blog D". The electronic device may analyze text information posted on the "blog D". More specifically, the electronic device may analyze text information displayed on the screen of the electronic device to determine a retrieval place to retrieve. Alternatively, though display has not been implemented, the electronic device may analyze text information posted on a relevant blog to determine a retrieval place to retrieve. That is, the electronic device may analyze text information of "it seems that pasta provided by a store E in a region A is most delicious" posted in the "blog D" to determine a retrieval place which the electronic device intends to retrieve is the "store E" positioned inside the "region A". Also, the electronic device may analyze text information posted in the "blog D" to determine additional information that pasta is being provided by the "store E" which is the retrieval place.

Figure 1D:
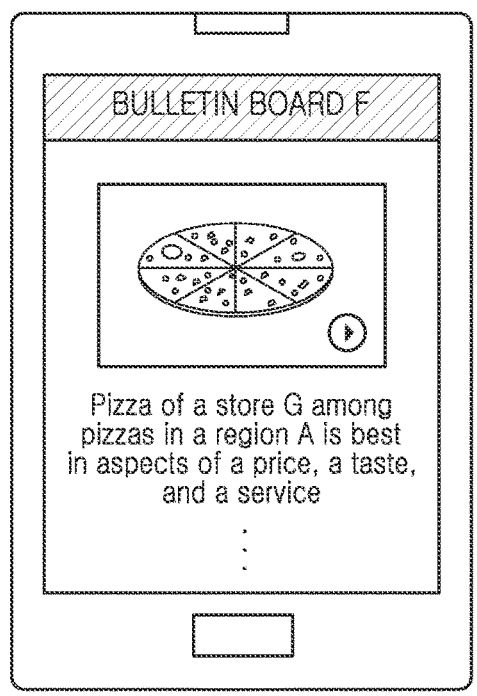

Referring to FIG. 1D, an electronic device accesses a web browser and then selects a "bulletin board F". The electronic device may analyze moving picture information and text information posted in the "bulletin board F". More specifically, the electronic device may analyze moving picture information and text information displayable on the screen of various display units of the electronic device to determine a retrieval place to retrieve. That is, the electronic device may analyze text information such as "pizza of a store G among pizzas in a region A is best in aspects of a price, a taste, and a service" posted in the "bulletin board F" to determine a retrieval place which the electronic device intends to retrieve is the "store G" positioned inside the "region A". Also, in the case where a moving picture is reproduced, the electronic device may determine additional information that pizza is being provided by the "store G".

Figure 2A:
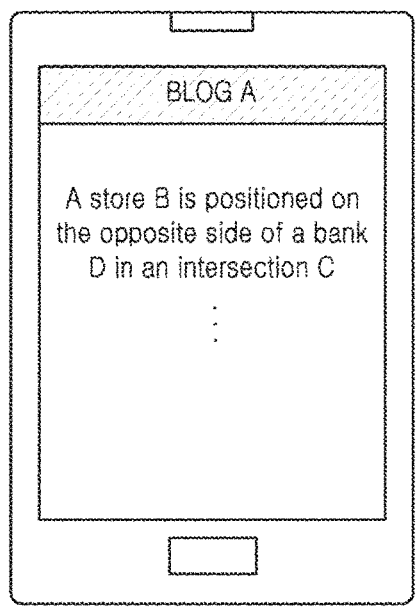
FIGS. 2A and 2B are views illustrating an embodiment of extracting information related to a retrieval place determined in an electronic device according to an embodiment of the present disclosure.
Figure 2B:
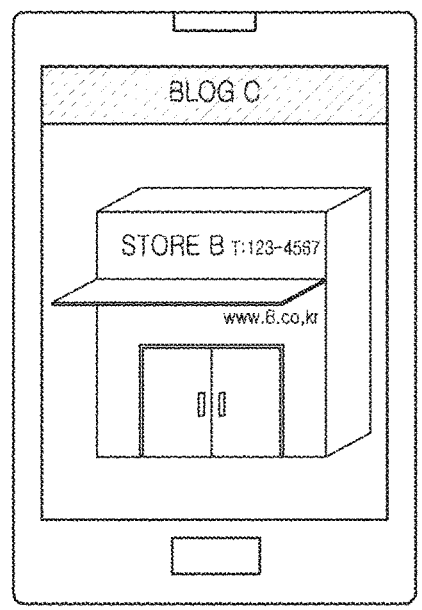

FIGS. 2A and 2B are views illustrating an embodiment of extracting information related to a retrieval place determined in an electronic device according to an embodiment of the present disclosure.

The electronic device may determine a retrieval place in order to provide position information using a plurality of contents information. The electronic device may extract information related to the determined retrieval place. For example, the electronic device may retrieve information related to a retrieval place using at least one of image information, voice information, QR code information, barcode information, audio information, text information, and moving picture information to obtain information related to the retrieval place. Here, the information related to the retrieval place retrieved by the electronic device may be at least one of position information, company name information, phone number information, company name appraisal information, business field information, and web address information related to the retrieval place.

For example, the electronic device may access a web browser to receive a keyword of "restaurant in a region E" via a search window. The electronic device may select a "blog A" among various contents provided by the web browser.

Referring to FIG. 2A, the electronic device may analyze all contents posted in the "blog A" in order to determine a retrieval place. The electronic device may analyze text information such as "a store B is positioned on the opposite side of a bank D in an intersection C" posted on the "blog A" to determine a retrieval place to retrieve is a "store B".

Also, in the case where accurate position information regarding the "store B" is not posted in the "blog A", the electronic device may extract information related to the "store B". That is, the electronic device may extract position information related to the "store B" included in the analyzed text information.

The electronic device may access a server providing position information or use position information stored inside the electronic device to extract position information of the "store B" inside a "region E". More specifically, the electronic device may access a server providing position information or use position information stored inside the electronic device to extract detailed position information of the "store B" positioned on the opposite side of the bank D in an intersection C inside the "region E".

For another example, the electronic device may access a web browser to receive a keyword of "department in the region E" via a search window. The electronic device may select a "blog C" among various contents provided by the web browser.

For example, as illustrated in FIG. 2B, the electronic device may analyze all contents posted in the "blog C" in order to determine a retrieval place. The electronic device may analyze an image of the "store B" posted in the "blog C" to recognize a retrieval place to retrieve is the "store B".

In the case where accurate position information regarding the "store B" is not posted in the "blog C", the electronic device may extract information related to the "store B". The electronic device may extract position information related to the "store B" included in analyzed image information. The electronic device may determine a phone number (123-4567) of the "store B" and a web address (www.B.co.kr) of the "store B", and the like. included in the image information to extract the position information, and the like. of the "store B". The electronic device may access a server providing position information or use position information stored inside the electronic device to extract detailed position information, and the like. of the "store B".

A conventional electronic device may not provide accurate position information regarding a retrieval place to retrieve using only image information and text information displayed on the screen of the electronic device, so that it was not able to meet a user's desire of intending to receive information regarding a retrieval place. That is, a user who uses the conventional electronic device has an inconvenience of having to additionally retrieve other contents.

An electronic device according to the present disclosure may analyze various contents to provide information regarding a position which the user desires to find out.

Figure 3A:
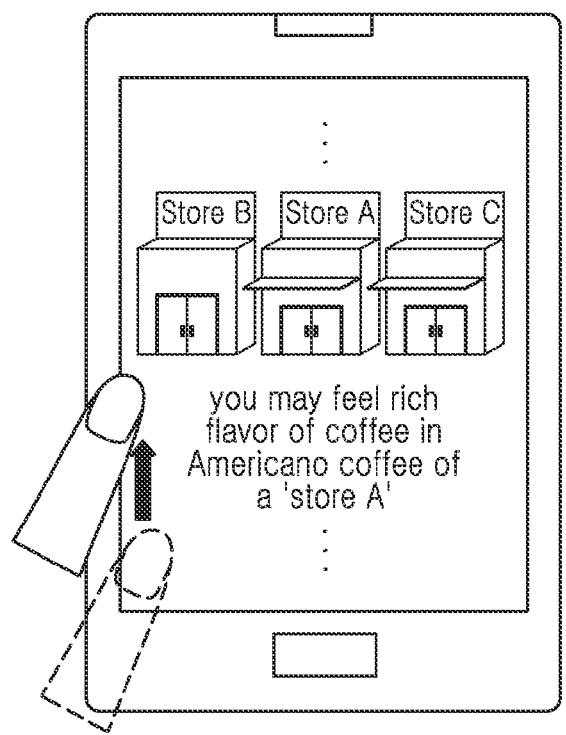
FIGS. 3A, 3B, and 3C are views illustrating an embodiment of determining validity of extracted information and providing related information regarding a retrieval place in an electronic device according to an embodiment of the present disclosure.
Figure 3B:
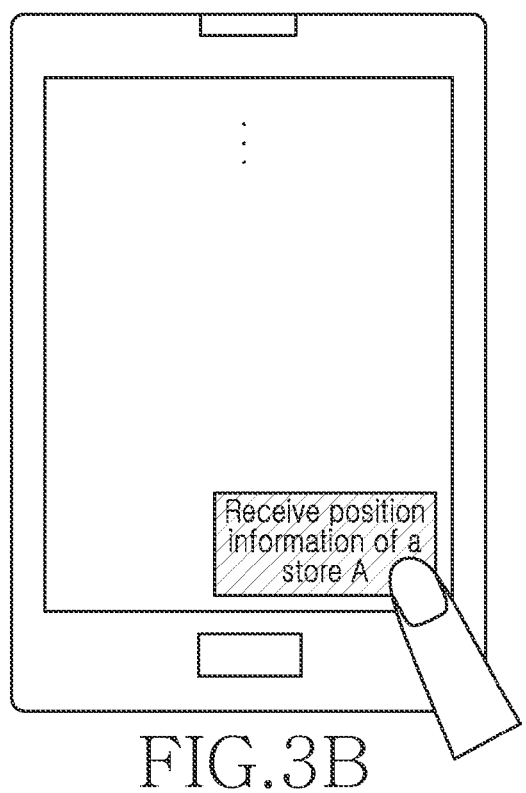
Figure 3C:
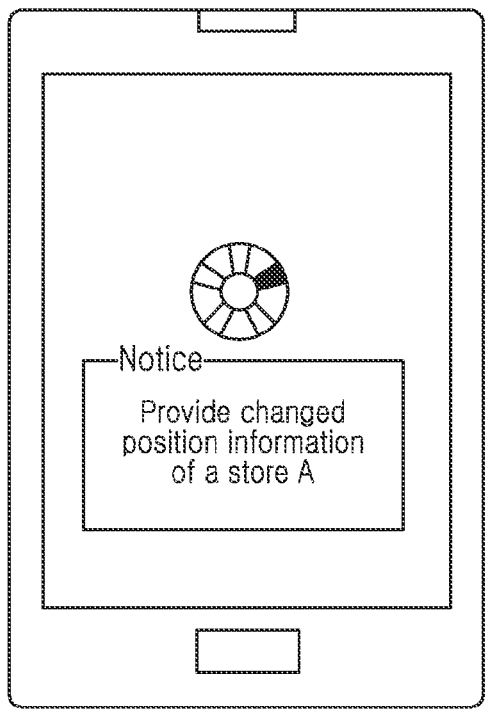

FIGS. 3A, 3B, and 3C area views illustrating an embodiment of determining validity of extracted information and providing related information regarding a retrieval place in an electronic device according to an embodiment of the present disclosure.

The electronic device may recognize a retrieval place using at least one content information, and then extract information related to the recognized retrieval place. The electronic device may determine validity of the extracted information to provide related information regarding the retrieval place. For example, the electronic device may provide related information regarding the retrieval place such as a determination result regarding whether the extracted information is valid, and the like.

Referring to FIG. 3A, the electronic device may provide related information regarding a "store A" to retrieve using image information and text information. For example, the electronic device may extract information that the position of the "store A" is adjacent to a "store B" and a "store C", and the "store A" is a coffee shop providing coffee.

The electronic device may determine whether the validity of extracted information of the "store A" is accepted first before providing related information regarding the "store A". For example, the electronic device may perform first a process for determining whether the extracted information regarding the retrieval place is reliable information in order to provide accurate information regarding the retrieval place.

For example, the method for determining whether extracted information is valid may compare information related to the extracted retrieval place with at least one of database information, an SNS, IM information, and information related to data stored in the electronic device to determine whether the related information is valid.

For example, the database information may be street view information, telephone number information, and card information updated every set time.

For example, the electronic device may compare information related to the extracted retrieval place with at least one of database information, and information related to an SNS stored in the electronic device or another electronic device to determine whether the "store A" is currently positioned at a position adjacent to the "store B" and the "store C", and whether the "store A" is currently a coffee shop providing coffee.

When determining the validity of the extracted information is accepted, the electronic device may provide related information regarding the retrieval place and information regarding an electronic device from which the information has been obtained in the form of at least one of an icon, text, an image, and voice information.

When determining the validity of the extracted information is not accepted, the electronic device may provide changed information regarding the retrieval place to retrieve. The electronic device may extract at least one of image information, phone number information, company name appraisal information, business field information, and web address information of a neighbor company name adjacent to the retrieval place, and compare the extracted at least one information with stored database information, and information related to an SNS to provide changed related information regarding the retrieval place in the form of at least one of an icon, text, an image, and voice information.

Referring to FIGS. 3B and 3C, in case of determining the validity of extracted information regarding the "store A" is not accepted, the electronic device may compare at least one of image information of a company name, telephone number information, and web address information regarding the "store B" and the "store C" with stored database information, and information related to an SNS to provide changed related information regarding the "store B".

For example, the electronic device may determine the validity of the extracted information is not accepted by analyzing metadata information included in at least one of voice information, QR code information, barcode information, image information, audio information, text information, and moving picture information and determining a time at which at least one information is posted using the analyzed metadata information. The electronic device may compare a time at which at least one information has been posted with at least one of a time at which database information has been stored and a time at which information related to an SNS has been posted to determine the at least one information is not updated information by determining whether the at least one information is updated information.

For example, in the above supposition, to determine the validity of the extracted information, the electronic device may analyze metadata included in image information and text information to determine a time at which each information has been posted. The electronic device may compare a time at which each information has been posted with at least one of a time at which database information has been stored and a time at which information related to an SNS has been posted to determine the relevant information is not updated information. As illustrated in FIGS. 3B and 3C, the electronic device may determine information related to the "store A" is not updated information to provide changed position information of the "store A".

In the case where position information regarding a retrieval place is provided, a conventional electronic device has not performed a process of determining the validity of provided position information. Since the conventional electronic device has not provided accurate information to a user, the electronic device has increased the user's confusion.

In the case where information regarding contents has changed, the electronic device according to the present disclosure may automatically provide changed position information, so that the electronic device may guarantee reliability of the provided information.

FIGS. 4A, 4B, 4C, and 4D area views illustrating an embodiment of providing information related to a retrieval place in an electronic device according to an embodiment of the present disclosure.

The electronic device may determine the validity of information regarding the retrieval place extracted by at least one electronic device is accepted. The electronic device may provide related information regarding a retrieval place in the form of an icon, text, an image, voice information, and the like. In the case where the validity of extracted information regarding a retrieval place is accepted, the electronic device may provide various information regarding the retrieval place as well as the position of the retrieval place. For example, the electronic device may determine the validity of extracted information regarding a "book store A" which is the retrieval place.

Referring to FIGS. 4A to 4D, to provide information regarding the "book store A" which is the retrieval place, the electronic device may display notice information such as "provide information of a retrieved book store A" on the screen of the electronic device. Simultaneously with this, or sequentially, the electronic device may display an icon capable of providing various information regarding a retrieval place on a set region of the screen of the electronic device.

For example, the icon may be an icon that may transmit a call to a representative phone number of a retrieval place, an icon that may connect to a web address of a retrieval place, an icon that may display position information of a retrieval place, an icon that may transmit position information of a retrieval place to a set navigation, and the like.

Figure 4A:
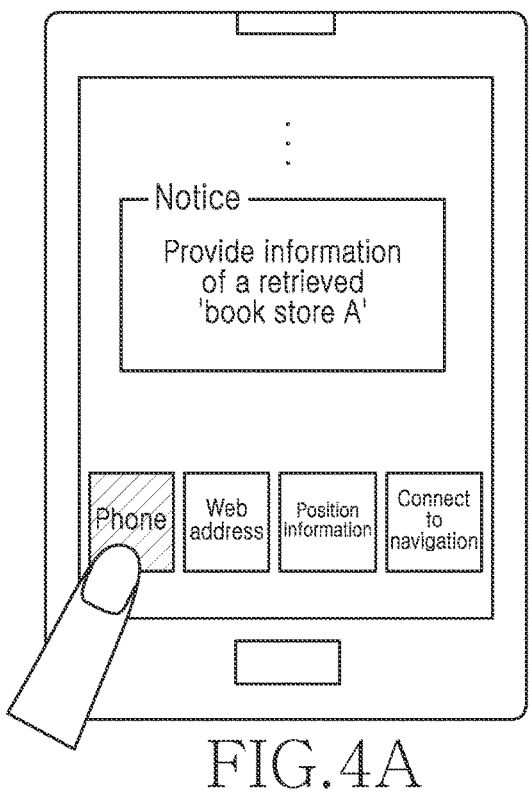
FIGS. 4A, 4B, 4C, and 4D are views illustrating an embodiment of providing information related to a retrieval place in an electronic device according to an embodiment of the present disclosure.

Referring to FIG. 4A, in case of receiving a "telephone icon" displayed on the set region of the screen of the electronic device, the electronic device may immediately transmit a call to the representative phone number of the "book store A" which is a retrieval place.

Figure 4B:
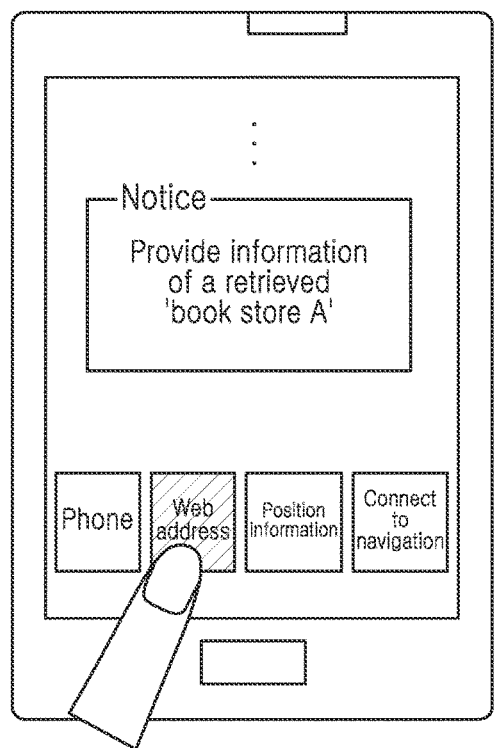

Referring to FIG. 4B, if the electronic device receives a "web address icon" displayed on the set region of the screen of the electronic device, the electronic device may be immediately connected to a web address of the "book store A" which is the retrieval place.

Figure 4C:
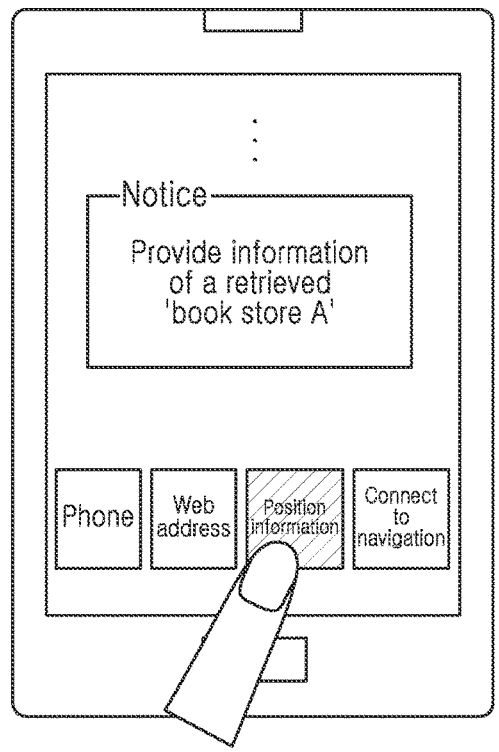

Referring to FIG. 4C, if the electronic device receives a "position information icon" displayed on the set region of the screen of the electronic device, the electronic device may provide the position information of the "book store A" which is the retrieval place. For example, the electronic device may display the position information of the "book store A" in the form of a 3-dimensional image such as a street view, and the like. on the screen of the electronic device in cooperation with a database stored in the electronic device.

Figure 4D:
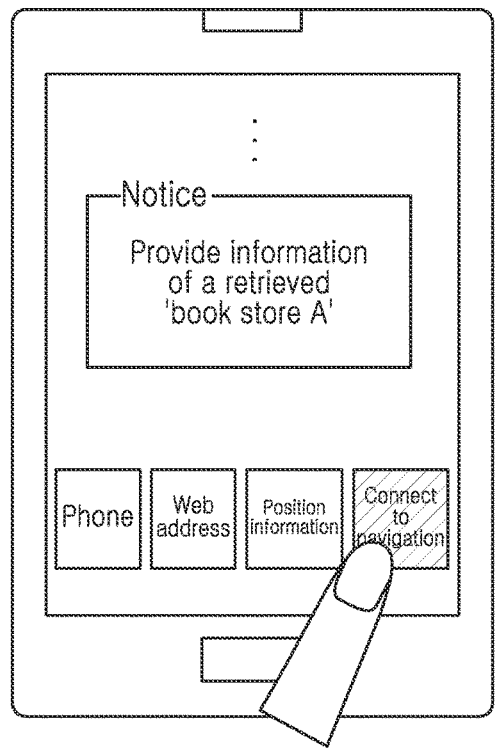

Referring to FIG. 4D, if the electronic device receives a "navigation connection icon" displayed on the set region of the screen of the electronic device, the electronic device may transmit position information of the "book store A" which is a retrieval place to a set navigation of the electronic device. For example, a user of the electronic device may receive the position information of the "book store A" using the set navigation of the electronic device.

Figure 5A:
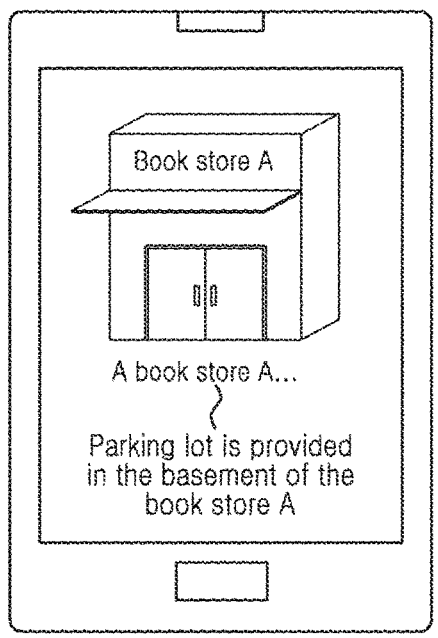
FIGS. 5A and 5B are views illustrating an embodiment of transmitting provided position information of a retrieval place to a navigation to guide the retrieval place using the navigation in an electronic device according to an embodiment of the present disclosure.
Figure 5B:
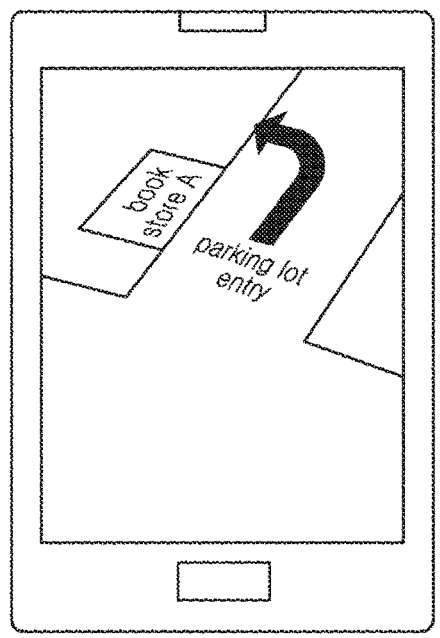

FIGS. 5A and 5B are views illustrating an embodiment of transmitting provided position information of a retrieval place to a navigation to guide the retrieval place using the navigation in an electronic device according to an embodiment of the present disclosure.

In the case where the validity of information regarding a retrieval place displayed on the screen of the electronic device is accepted, the electronic device may provide related information regarding the retrieval place displayed on the screen of the electronic device. In case of receiving a "navigation connection icon" displayed on the set region of the screen of the electronic device, the electronic device may transmit position information of a retrieval place to a set navigation of the electronic device.

For example, a retrieval place determined by the electronic device is the "book store A" and the electronic device may extract text information displayed on the screen of the electronic device to transmit the position information of the "book store A" to the set navigation of the electronic device.

For example, in the case where the validity of extracted position information regarding the "book store A" is accepted, the electronic device may transmit even detailed parking information displayed on the screen of the electronic device to a set navigation.

Referring to FIG. 5A, the electronic device may extract text information such as "parking lot is provided in the basement of the book store A" displayed on the screen of the electronic device, and transmit detailed parking information to the set navigation.

Referring to FIG. 5B, the set navigation of the electronic device not only may guide the position of the "book store A" but also may display even the detailed inner space of the parking lot. The navigation may guide not only the position of the "book store A" at a current position but also the inner space of the parking lot in detail.

A conventional electronic device was not able to guide a user up to a detailed position space due to a limitation of position information stored in a set database.

An electronic device according to the present disclosure not only may guide a retrieval place which a user desires to retrieve using a set navigation but also may provide even information not stored in a database such as a parking space.

Figure 6A:
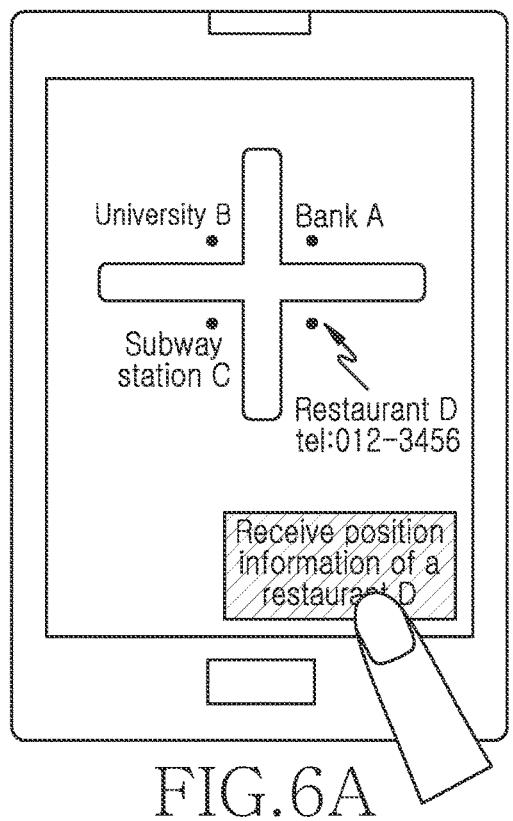
FIGS. 6A, 6B, and 6C area views illustrating an embodiment of analyzing a one-dimensional image having no detailed information to provide accurate 3-dimensional position information for a retrieval place according to an embodiment of the present disclosure.
Figure 6B:
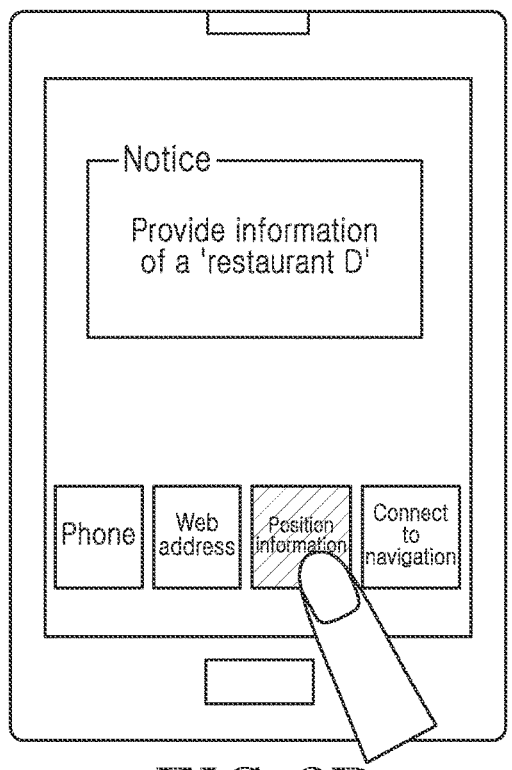
Figure 6C:
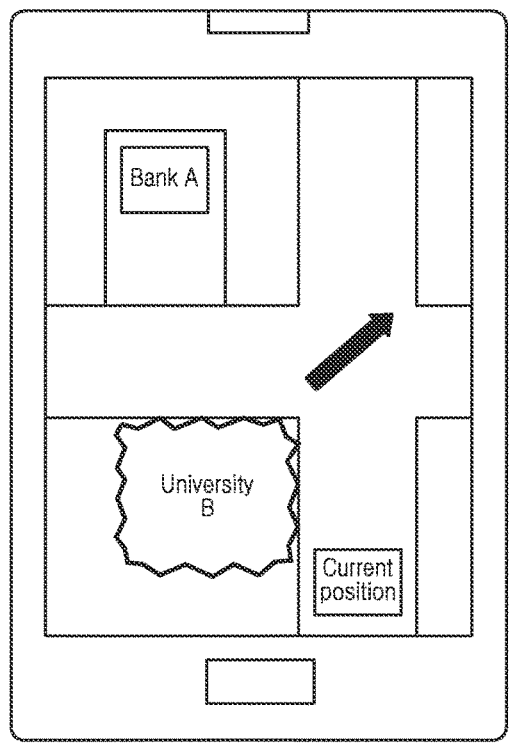

FIGS. 6A, 6B, and 6C are views illustrating an embodiment of analyzing a one-dimensional image having no detailed information to provide accurate 3-dimensional position information for a retrieval place according to an embodiment of the present disclosure.

The electronic device may analyze one-dimensional image having no detailed information stored in the electronic device. For example, the electronic device may analyze a rough map which a person draws with his hand and a one-dimensional image having no detailed position information posted on a card or a leaflet.

Referring to FIG. 6A, the electronic device may shoot a rough map representing a schematic position of a "restaurant D" posted on the backside of a leaflet. If a user's intention is to receive 3-dimensional accurate position information of the "restaurant D".

In case of receiving an instruction of intending to receive the position information of a shot image, the electronic device may analyze one-dimensional image in order to determine a retrieved place. For example, the electronic device may recognize a set image such as an arrow using an optical character recognition function to determine the "restaurant D" as a retrieval place.

The electronic device may extract phone number information (012-3456) of the "restaurant D", a rough map of the "restaurant D", and neighbor building information (a bank A, a university B, and a subway station C) included in the shot image, and then compare the same with a database stored in the electronic device to obtain detailed position information of the "restaurant D".

Referring to FIG. 6B, after determining whether obtained position information is position information having accuracy, in the case where the accuracy of the position information is accepted, the electronic device may provide information regarding a retrieval place to a set region of the screen of the electronic device in the form of an icon. For example, the electronic device may provide various information of the "restaurant D" together with a notice message such as "provide information of the restaurant D" on the screen of the electronic device.

Referring to FIG. 6B, in the case of receiving the "position information icon" displayed on the set region of the screen of the electronic device, the electronic device may provide position information of the "restaurant D" which is a retrieval place. The electronic device may display the position information of the "restaurant D" on the screen of the electronic device in the form of a 3-dimensional image such as a street view in cooperation with a data base stored in the electronic device.

Figure 7:
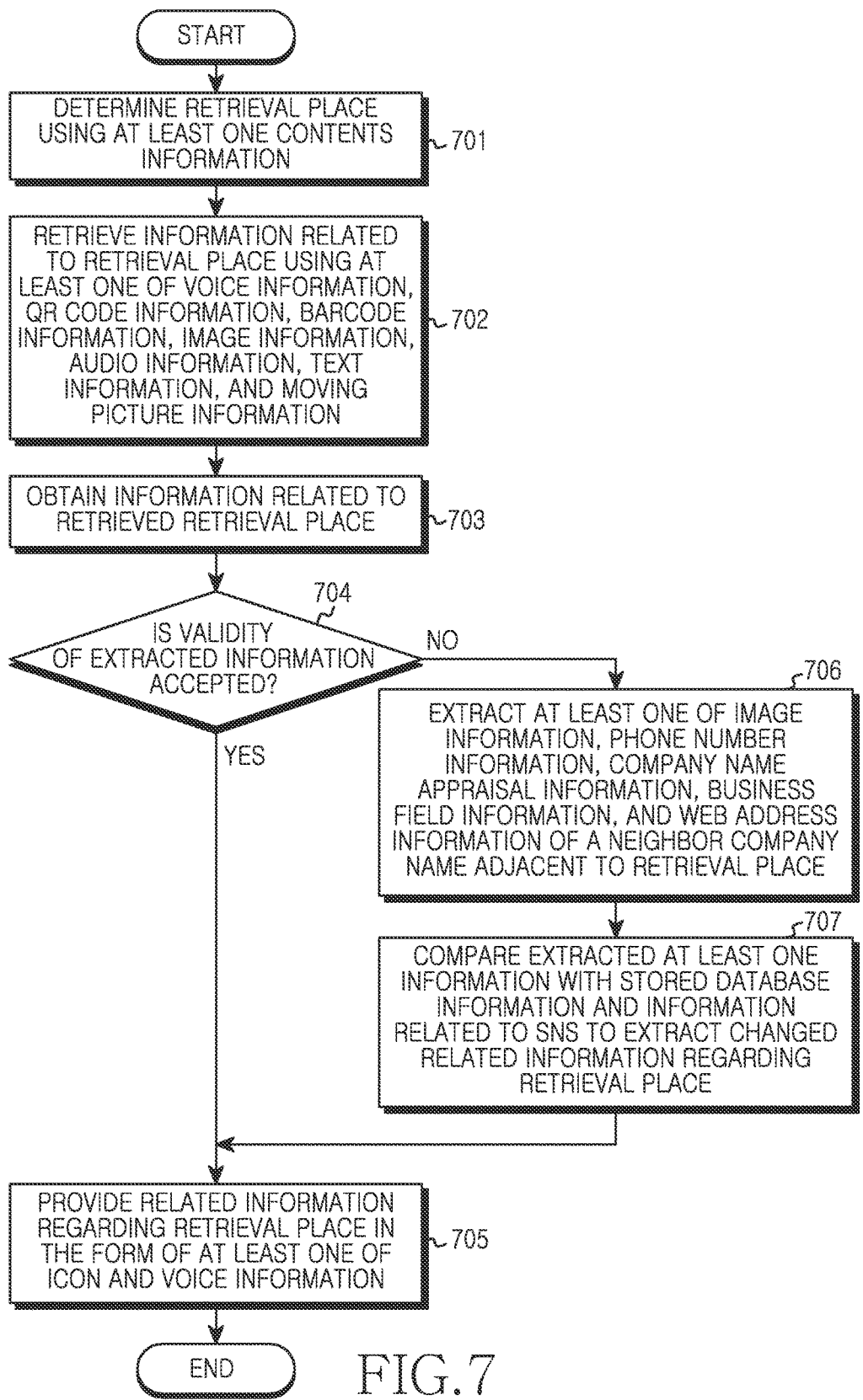
FIG. 7 is a flowchart illustrating a sequence of operating an electronic device according to an embodiment of the present disclosure.

FIG. 7 is a flowchart illustrating a sequence of operating an electronic device according to an embodiment of the present disclosure.

Referring to FIG. 7, the electronic device may determine a retrieval place using at least one contents information at operation 701. More specifically, the electronic device may determine the retrieval place first in order to provide position information using a plurality of contents information. That is, the electronic device may analyze at least one of an input keyword, voice information, QR code information, barcode information, image information, audio information, text information, and moving picture information to determine the retrieval place.

After that, the electronic device may retrieve information related to the retrieval place using at least one of voice information, QR code information, barcode information, image information, audio information, text information, and moving picture information at operation 702. For example, the electronic device may retrieve all information related to a retrieval place determined using at least one contents information.

The electronic device may obtain information related to the retrieved retrieval place at operation 703. More specifically, the electronic device may obtain at least one of position information, company name information, phone number information, company name appraisal information, business field information, and web address information related to the retrieval place.

The electronic device may determine whether the validity of extracted information is accepted at operation 704. A method for determining whether extracted information is valid, for example, may compare extracted information related to a retrieval place with at least one of database information and information related to an SNS to determine sameness, and in the case where the sameness is accepted, the method may determine the validity of extracted information is accepted. For example, a method for determining whether extracted information is valid may compare information related to an extracted retrieval place with at least one of database information and information related to an SNS to determine whether they are the same, and in the case where sameness is not accepted, the method may determine the validity of the extracted information is not accepted. For example, the database information may be street view information updated every set time.

In case of determining the electronic device has accepted the validity of extracted information in the above-described determination process at operation 704, the electronic device may provide related information regarding a retrieval place in the form of at least one of an icon, text, an image, and voice information at operation 705. The icon may be an icon that may transmit a call to a representative number of a retrieval place, an icon that may connect to a web address of a retrieval place, an icon that may display position information of a retrieval place, an icon that may transmit position information of a retrieval place to a set navigation, and the like.

In the above determination process at operation 704, in the case where the electronic device determines the validity of the extracted information is not accepted, the electronic device may extract at least one of image information, phone number information, company name appraisal information, business field information, and web address information of a neighbor company name adjacent to the retrieval place at operation 706. For example, to provide accurate information regarding a retrieval place, the electronic device may extract at least one of image information, phone number information, company name appraisal information, business field information, and web address information of a neighbor company name adjacent to the retrieval place.

The electronic device may compare extracted at least one information with stored database information and information related to an SNS to extract changed related information regarding the retrieval place at operation 707. For example, the electronic device may analyze metadata included in at least one of voice information, QR code information, barcode information, image information, audio information, text information, and moving picture information to determine a time at which at least one information has been posted using the analyzed metadata information. After that, the electronic device may compare a time at which at least one information has been posted with at least one of a time at which database information has been stored and a time at which information related to an SNS has been posted to determine whether the at least one information is updated information and extract changed related information regarding the retrieval place.

Figure 8:
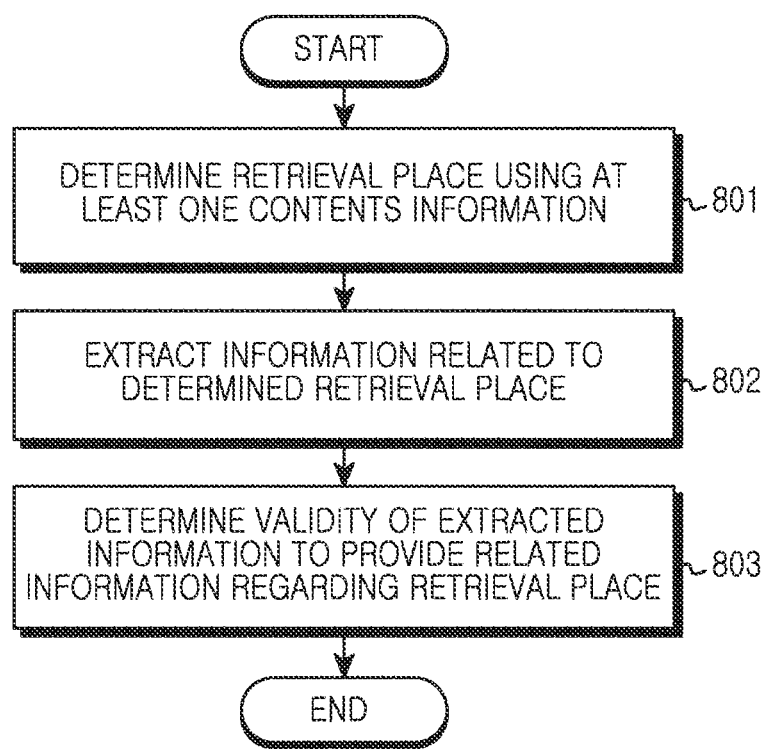
FIG. 8 is a flowchart illustrating a method of an electronic device, for providing related information regarding a retrieval place according to an embodiment of the present disclosure.

FIG. 8 is a flowchart illustrating a method of an electronic device, for providing related information regarding a retrieval place according to an embodiment of the present disclosure.

Referring to FIG. 8, the electronic device may determine a retrieval place using at least one content information at operation 801. For example, the electronic device may determine a retrieval place first in order to provide position information using a plurality of contents information. For example, the electronic device may analyze at least one of an input keyword, voice information, QR code information, barcode information, image information, audio information, text information, and moving picture information to determine a retrieval place.

The electronic device may extract information related to the determined retrieval place at operation 802. For example, the electronic device may retrieve all information related to the determined retrieval place using at least one contents information. The electronic device may obtain at least one of position information, company name information, phone number information, company name appraisal information, business field information, and web address information related to the retrieval place.

The electronic device may determine the validity of extracted information to provide related information regarding a retrieval place at operation 803. For example, the icon may be an icon that may transmit a call to a representative number of a retrieval place, an icon that may connect to a web address of a retrieval place, an icon that may display position information of a retrieval place, an icon that may transmit position information of a retrieval place to a set navigation, and the like.

Figure 9:
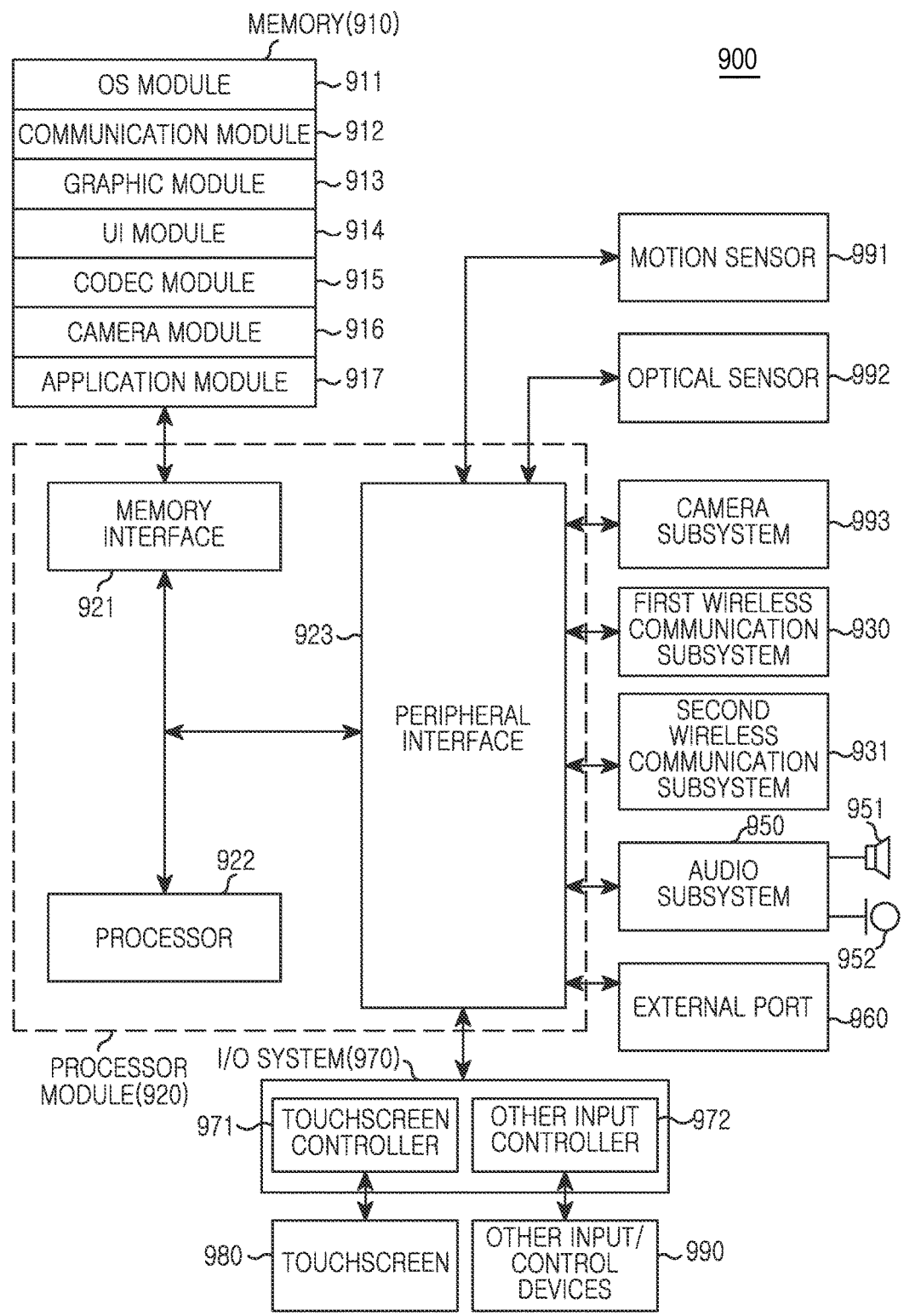
FIG. 9 is a block diagram illustrating an electronic device according to an embodiment of the present disclosure.

FIG. 9 is a block diagram illustrating an electronic device according to an embodiment of the present disclosure.

Referring to FIG. 9, the electronic device 900 may be a portable electronic device, and may be a device such as a portable terminal, a mobile phone, a mobile pad, a media player, a tablet computer, a handheld computer, or a Persona Digital Assistant (PDA). Also, the electronic device may be an arbitrary portable electronic device including a device combining two or more functions among these devices.

This electronic device 900 includes a memory 910, a processor module 920, a first wireless communication subsystem 930, a second wireless communication subsystem 931, an external port 960, an audio subsystem 950, a speaker 951, a microphone 952, an Input/Output (I/O) system 970, a touchscreen 980, and other input or control units 990. While a single memory 910 and external port 960 is illustrated, it will be understood by those of ordinary skill that a plurality of memories and plurality of external ports may be employed.

The processor module 920 may include a memory interface 921, one or more processors 922, and a peripheral interface 923. Depending on cases, the whole processor module 920 may be called a processor. In the present disclosure, the processor module 920 may determine a retrieval place using at least one contents information to extract information related to the determined retrieval place, and determine the validity of the extracted information to provide related information regarding the retrieval place. Also, the processor module 920 may analyze at least one of an input keyword, voice information, QR code information, barcode information, image information, audio information, text information, and moving picture information to determine a retrieval place. Also, the processor module 920 may retrieve information related to a retrieval place using at least one of voice information, QR code information, barcode information, image information, audio information, text information, and moving picture information to obtain information related to the retrieved retrieval place. Also, the processor module 920 may obtain at least one of position information, company name information, phone number information, company name appraisal information, business field information, and web address information related to the retrieval place. Also, the processor module 920 may determine whether extracted information is valid and provide related information regarding the retrieval place depending on whether the validity of the extracted information is accepted. Also, the processor module 920 may compare extracted information related to a retrieval place with at least one of stored database information and information related to an SNS to determine whether they are the same, and in the case where the sameness is accepted, the processor module 920 may determine the validity of the extracted information is accepted. Also, the processor module 920 may compare extracted information related to a retrieval place with at least one of stored database information and information related to an SNS to determine whether they are the same, and in the case where the sameness is not accepted, the processor module 920 may determine the validity of the extracted information is not accepted. Also, the processor module 920 may determine the validity of the extracted information is accepted to provide related information regarding a retrieval place in the form of at least one of an icon and voice information. Also, the processor module 920 may determine the validity of the extracted information is not accepted to extract at least one of image information, phone number information, company name appraisal information, business field information, and web address information, and compare the at least one extracted information with stored database information and information related to an SNS to extract changed related information regarding the retrieval place, and provide the extracted information in the form of at least one of an icon and voice information. Also, the processor module 920 may analyze metadata information included in at least one of voice information, QR code information, barcode information, image information, audio information, text information, and moving picture information, determine a time at which the at least one information has been posted using the analyzed metadata information, compare a time at which the at least one information has been posted with at least one of a time at which database information has been stored and a time at which information related to an SNS has been posted to determine whether the at least one information is updated information and determine the at least one information is updated information.

The processor module 920 executes various software programs to perform various functions for the electronic device 900 and also performs a process and a control for voice communication and data communication. Also, in addition to these general functions, the processor 922 executes a specific software module (an instruction set) stored in the memory 910 to perform specific various functions corresponding to the module. That is, the processor 922 performs a method of an embodiment of the present disclosure in cooperation with software modules stored in the memory 910.

The processor 922 may include one or more data processors, image processors, or CODECs. The data processor, the image processor, and the CODEC may be configured separately. Also, they may be configured using various processors performing different functions. The peripheral interface 923 connects the I/O subsystem 970 of the electronic device 900 and various peripherals to the processor 922 and the memory 910 (via a memory interface).

Various elements of the electronic device 900 may be coupled by one or more communication buses (reference numeral not shown) or stream lines (reference numeral not shown).

The external port 960 is used for directly connecting a portable electronic device (not shown) to another electronic device or indirectly connecting the portable electronic device to another electronic device via a network (for example, the Internet, an intranet, a wireless LAN, and the like). The external port 960, for example, though not limited thereto, denotes a Universal Serial Bus (USB) port or a FIREWIRE port, and the like.

A motion sensor 991 and an optical sensor 992 may be coupled to the peripheral interface 923 to enable various functions. For example, the movement sensor 991 and the optical sensor 992 may be coupled to the peripheral interface 923 to enable detection of movement of the electronic device and detection of light from the outside. Besides, other sensors such as a position measurement system, a temperature sensor, or a living body sensor, and the like, may be connected to the peripheral interface 923 to perform related functions.

The camera subsystem 993 may perform a camera function such as a photo and video clip recording.

The optical sensor 992 may be a Charged Coupled Device (CCD) or a Complementary Metal Oxide Semiconductor (CMOS) device.

The electronic device performs a communication function via one or more wireless communication systems 930 and 931. The wireless communication subsystems 930 and 931 may include a Radio Frequency (RF) receiver and a transceiver and/or light (for example, an infrared) receiver and transceiver. The first communication subsystem 930 and the second communication subsystem 931 may be classified depending on a communication network via which the electronic device 900 communicates. For example, the communication network, though not limited thereto, may include a communication subsystem designed to operate via a Global System for Mobile Communication (GSM) network, an Enhanced Data GSM Environment (EDGE) network, a Code Division Multiple Access (CDMA) network, a Wide (W)-CDMA network, a Long Term Evolution (LTE) network, an Orthogonal Frequency Division Multiple Access (OFDMA) network, a Wireless Fidelity (Wi-Fi) network, a WiMax network and/or a Bluetooth network, and the like. The first wireless communication subsystem 930 and the second wireless communication subsystem 931 may merge to form one wireless communication subsystem.

The audio subsystem 950 may be coupled to a speaker 951 and a microphone 952 to take charge of voice recognition, voice duplication, digital recording, and an input/output of an audio stream such as a telephone function. That is, the audio subsystem 950 communicates with a user via the speaker 951 and the microphone 952. The audio subsystem 950 receives a data stream via the peripheral interface 923 of the processor module 920, and converts the received data stream to an electric stream. The converted electric stream (electric signal) is transferred to the speaker 951. The speaker 951 converts an electric stream to a sound wave audible by a person and outputs the same. The microphone 952 converts a sound wave transferred from a person or other sound sources to an electric stream. The audio subsystem 950 receives an electric stream converted from the microphone 952. The audio subsystem 950 converts the received electric stream to an audio data stream, and transmits the converted audio data stream to the peripheral interface 923. The audio subsystem 950 may include an attachable and detachable ear phone, a headphone, or a head set.

The I/O subsystem 970 may include a touchscreen controller 971 and/or another input controller 972. The touchscreen controller 971 may be coupled to the touchscreen 980. The touchscreen 980 and the touchscreen controller 971, though not limited thereto, may detect a contact and movement or stoppage of these using not only capacitive, resistive, infrared, and surface acoustic wave technologies for determining one or more contact points with the touchscreen 980 but also an arbitrary multi-touch detect technology including other proximity sensor arrangement or other elements. Another input controller 972 may be coupled to other input/control units 990. The other input/control units 990 may be one or more buttons, a rocker switch, a thumb-wheel, a dial, a stick, and/or a pointer device such as a stylus.

The touchscreen 980 provides an input/output interface between the electronic device 900 and a user. That is, the touchscreen 980 transfers a user's touch input to the electronic device 900. Also, the touchscreen 980 serves as a medium for showing an output from the electronic device 900 to the user. That is, the touchscreen 980 shows a visual output to the user. This visual output is represented in the form of text, graphics, video, and a combination of these.

For the touchscreen, various displays may be used. For example, though not limited thereto, a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED) or a Flexible LED (FLED) may be used as the touchscreen.

The memory 910 may be coupled to the memory interface 921. The memory 910 may include a high speed random access memory such as one or more magnetic disk storages and/or a non-volatile memory, one or more optical storages and/or a flash memory (for example, NAND, NOR).

The memory 910 stores a plurality of software elements including an Operating System (OS) module 911, a communication module 912, a graphics module 913, a user interface (UI) module 914, a CODEC module 915, a camera module 916, one or more application modules 917, and the like. Also, since a module which is a software element may be expressed as a set of instructions, the module may be also expressed as an instruction set. The module may be also expressed as a program. The OS software 911 (for example, WINDOWS, LINUX, Darwin, RTXC, UNIX, OS X, or a built-in OS such as VxWorks) includes various software elements for controlling a general system operation. Control of this general system operation denotes, for example, memory management and control, hardware (device) control and management, power control and management, and the like. This OS software also performs a function for swift communication between various hardwares (devices) and software elements (modules).

The communication module 912 may enable communication with other electronic devices such as a computer, a server and/or a portable terminal, and the like. via the wireless communication subsystems 930 and 931 or the external port 960.

The graphics module 913 includes various software elements for providing and displaying graphics on the touchscreen 980. A terminology of graphics is used as meaning including text, a web page, an icon, a digital image, a video, an animation, and the like.

The UI module 914 includes various software elements related to a UI. The UI module 914 includes content regarding how the state of a UI changes or under what condition the state of the UI changes.

The CODEC module 915 may include a software element related to encoding and decoding of a video file. The CODEC module 915 may include a video stream module such as an MPEG module and/or an H204 module. Also, the CODEC module 915 may include a CODEC module for various audio files such as AAA, AMR, WMA, and the like. Also, the CODEC module 915 includes an instruction set corresponding to an embodiment method of the present disclosure.

The camera module 916 includes a camera-related software element enabling a camera-related process and functions.

The application module 917 includes a browser, an e-mail, an instant message, word processing, keyboard emulation, an address book, a touch list, a widget, a Digital Right Management (DRM), voice recognition, voice duplication, a position determining function, a location based service, and the like.

Also, various functions of the electronic device 900 according to the present disclosure mentioned above or to be mentioned below may be one or more stream processings and/or a hardware including an Application Specific Integrated Circuit (ASIC) and/or a software and/or a combination of these.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    determining a retrieval place using at least one contents information;
    retrieving information related to the determined retrieval place; and
    determining whether the retrieved information is a latest updated information related to the retrieval place,
    wherein, in response to determining that the retrieved information is the latest updated information, providing the retrieved information, and
    wherein, in response to determining that the retrieved information is not the latest updated information,
        retrieving information on a neighbor place adjacent to the determined retrieval place,
        obtaining a latest updated information of the retrieval place based on the information on the neighbor place, and
        providing the obtained latest updated information of the retrieval place.

2. The method of claim 1, wherein the determining of the retrieval place using the at least one contents information comprises:
    analyzing at least one of an input keyword, voice information, QR code information, barcode information, image information, audio information, text information, or moving picture information to determine the retrieval place.

3. The method of claim 1, wherein the retrieving of the information related to the determined retrieval place comprises:
    retrieving information related to the determined retrieval place using at least one of an input keyword, voice information, QR code information, barcode information, image information, audio information, text information, or moving picture information, and
    obtaining the information related to the retrieved retrieval place.

4. The method of claim 3, wherein the obtaining of the information related to the retrieved retrieval place comprises:
    obtaining at least one of the position information, company name information, phone number information, company name appraisal information, business field information, or web address information related to the determined retrieval place.

5. The method of claim 1, wherein the determining of whether the retrieved information is the latest updated information comprises:
    comparing the retrieved information related to the determined retrieval place with at least one of stored database information, a Social Network Service (SNS), Instant Message (IM) information, and information related to stored data to determine whether they are the same, and
    determining, based on the comparison result, whether the retrieved information is a latest updated information related to the retrieval place.

6. The method of claim 1, wherein the providing of the retrieved information further comprises providing the retrieved information in the form of at least one of text, an image, a QR code, a barcode, audio, video, or voice information.

7. The method of claim 1, wherein the information on the neighbor place comprises:
    at least one of image information, phone number information, or web address information of the neighbor place.

8. The method of claim 5, wherein the stored database information is street view information updated at every set time.

9. The method of claim 6, wherein the icon comprises at least one of:
- an icon capable of transmitting a call to a representative number of the determined retrieval place,
- an icon capable of connecting to a web address of the determined retrieval place, or
- an icon capable of displaying the position information of the determined retrieval place.

10. The method of claim 1,
wherein the determining of whether the retrieved information is the latest updated information related to the retrieval place comprises determining a validity of the retrieved information related to the determined retrieval place, and
wherein the determining of the validity of the retrieved information related to the determined retrieval place, comprises:
- analyzing metadata information included in at least one of voice information, QR code information, barcode information, image information, audio information, text information, or moving picture information,
- determining a time at which the at least one information has been posted using the analyzed metadata information,
- comparing the time at which the at least one information has been posted with at least one of a time at which database information has been stored, or a time at which an SNS, IM information, and information related to data stored in the electronic device have been posted, to determine whether the at least one information is updated information, and
- determining the at least one information is the updated information.

11. An electronic device comprising:
a display;
a memory; and
a processor module configured to:
- determine a retrieval place using at least one contents information,
- retrieve information related to the determined retrieval place, and
- determine whether the retrieved information is a latest updated information related to the retrieval place,
wherein, in response to determining that the retrieved information is the latest updated information, the processor module is further configured to provide the information related to the determined retrieval place in response to determining that the retrieved information, and
wherein, in response to determining that the retrieved information is not the latest updated information, the processor module is further configured to:
- retrieve information on a neighbor place adjacent to the determined retrieval place,
- obtain a latest updated information of the retrieval place based on the information on the neighbor place, and
- provide the obtained latest updated information of the retrieval place.

12. The electronic device of claim 11, wherein the processor module is further configured to analyze at least one of an input keyword, voice information, QR code information, barcode information, image information, audio information, text information, or moving picture information, to determine the retrieval place.

13. The electronic device of claim 11, wherein the processor module is further configured to retrieve information related to the determined retrieval place using at least one of an input keyword, voice information, QR code information, barcode information, image information, audio information, text information, or moving picture information, to obtain information related to the retrieved retrieval place.

14. The electronic device of claim 13, wherein the processor module is further configured to obtain at least one of the position information, company name information, company name appraisal information, business field information, phone number information, or web address information related to the retrieval place.

15. The electronic device of claim 11, wherein the processor module is further configured to:
- compare the retrieved information related to the determined retrieval place with at least one of stored database information, a Social Network Service (SNS), Instant Message (IM) information, or information related to data stored in the electronic device, to determine whether they are the same, and
- determine, based on the comparison result, whether the retrieved information is a latest updated information related to the retrieval place.

16. The electronic device of claim 11, wherein the processor module is further configured to provide the retrieved information in the form of at least one of an icon, text, a QR code, a barcode, an audio, a video, or voice information.

17. The electronic device of claim 11,
wherein the information on the neighbor place comprises at least one of image information, phone number information, or web address information of the neighbor place.

18. The electronic device of claim 15, wherein the stored database information is street view information updated at every set time.

19. The electronic device of claim 16, wherein the icon comprises at least one of:
- an icon capable of transmitting a call to a representative number of the determined retrieval place,
- an icon capable of connecting to a web address of the determined retrieval place, or
- an icon capable of displaying the position information of the determined retrieval place.

20. The electronic device of claim 11, wherein the processor module is further configured to:
- analyze metadata information included in at least one of voice information, QR code information, barcode information, audio information, image information, text information, or moving picture information,
- determine a time at which the at least one information has been posted using the analyzed metadata information,
- compare the time at which the at least one information has been posted with at least one of a time at which database information has been stored, or a time at which an SNS, IM information, and information related to stored data have been posted, to determine whether the at least one information is updated information, and
- determine the at least one information is the updated information.

21. At least one non-transitory processor readable medium for storing a computer program of instructions configured to be readable by at least one processor for instructing the at least one processor to execute a computer process for performing the method as recited in claim 1.

* * * * *